April 25, 1933.  H. B. DRURY  1,905,998
ANTISKID CHAIN
Filed April 23, 1931
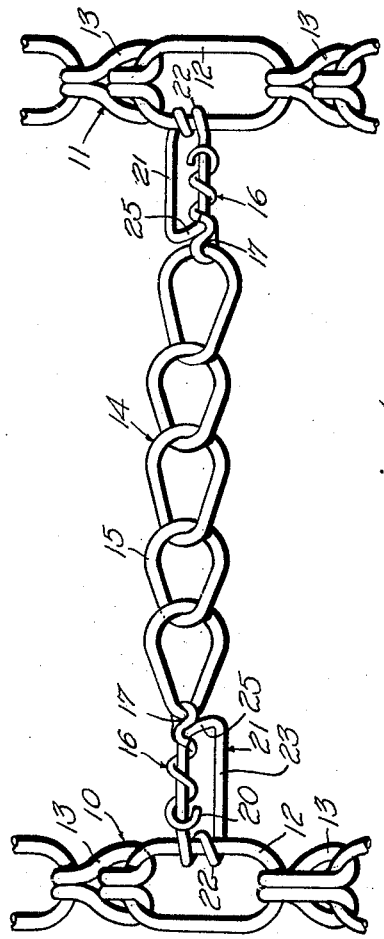
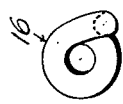
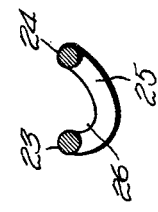
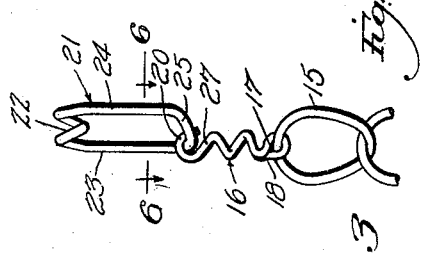
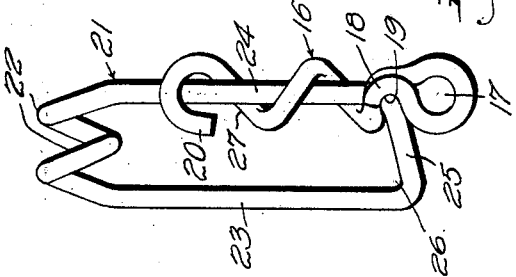
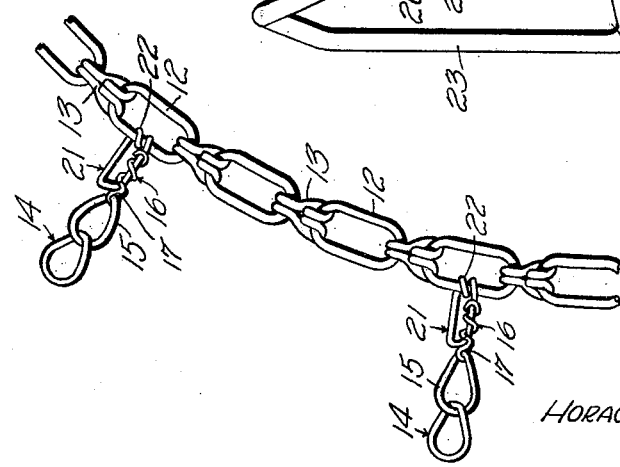
Inventor
HORACE B. DRURY
By C. L. Parker Jr.
Attorney Patented Apr. 25, 1933

1,905,998

UNITED STATES PATENT OFFICE

HORACE B. DRURY, OF WASHINGTON, DISTRICT OF COLUMBIA

ANTISKID CHAIN

Application filed April 23, 1931. Serial No. 532,324.

This invention relates to improvements in anti-skid devices for vehicle wheels of the type wherein spaced side members are arranged around the sides of the tire carried by the wheel and are connected by a plurality of transverse traction or anti-skid members arranged across the tire.

In the application of Horace F. Drury, Serial No. 475,295, filed August 14th, 1930, there has been disclosed a detachable connection between the side and transverse members of the device by means of which a transverse member, when broken, will be automatically detached from the side members, but no means was provided to compel the broken transverse members to detach themselves at any particular point. Consequently, the broken members upon detachment possibly could be thrown into contact with pedestrians or with other vehicles. While the possibility of injury by the thrown broken members is extremely remote, it is deemed advisable in order to provide a maximum degree of safety to provide means for positively preventing disengagement of the broken members until they strike the ground, and to compel this disengagement at such point, thereby avoiding any possibility of injury by the thrown members.

Therefore, it is an important object of this invention to provide a detachable connection between the transverse and side members of an anti-skid device, whereby broken transverse members will not become detached from the side members at any point which might result in the broken members being thrown rearwardly where possible injury might occur.

A further object of this invention is to provide a detachable connection between the transverse and side members of an anti-skid device, whereby, when a transverse member becomes broken while in use, the broken parts thereof will assume positions ready to become detached, but will not actually become detached until the broken members strike the ground.

A further object is to provide a novel transverse member including the usual tread link sections each having a spiralled member secured to each end, each spiralled member having its outer end terminating in a hook to prevent its detachment from the side members until the broken transverse members contact with the ground.

A further object is to provide a novel connecting link carried by the side members of the device upon which the spiralled member may be mounted when the device is assembled and from which the spiralled member may readily unwind itself to throw off a broken section of tread links, the connecting link being provided with a portion engageable by the hook of the spiralled member to prevent total disengagement of the latter until the broken section of tread links strikes the ground.

A further object is to provide a novel spiralled member and hook for connecting the transverse member to the connecting link.

Other objects and advantages of the invention will become apparent from the following description.

In the drawing I have shown a preferred embodiment of the invention. In this showing, Figure 1 is a plan view of a portion of the device with the transverse members connected between the side members, Figure 2 is a reduced side elevation of a portion of the device, Figure 3 is an enlarged detail view showing the spiral member in proper position with respect to the connecting link when the device is assembled, Figure 4 is a detail view showing the position of the hook with respect to the connecting link as the former is ready to be released from engagement with the latter, Figure 5 is an enlarged end elevation of one of the spiral members, and, Figure 6 is an enlarged detail sectional view taken substantially on line 6—6 of Figure 4, with the spiral member removed.

Referring to the drawing, the numerals 10 and 11 indicate the side members of an anti-skid device as a whole, each of which comprises the usual chain formed of a plurality of large links 12 connected by smaller links or hooks 13.

The side chain members are adapted to be arranged in the usual manner on opposite sides of the tire of a vehicle wheel and are connected across the tire at spaced intervals by transverse members indicated as a whole by the numeral 14. Each transverse member comprises a section 15 of connected tread links to the outer ends of which, spiral connecting members 16 are secured.

Each spiral member 16 is connected to the tread links through an eye 17 formed on one end of the member in alignment with the axis of the spirals. The eye 17 may be formed in the conventional manner, but it is preferred that the eye be formed as clearly shown in Figure 3, with the end 18 of the spiral member bent back a short distance upon the first turn of the spiral and having a stop shoulder 19 formed therein for a purpose to be described. The end 18 may be welded or otherwise suitably secured to the spiral loop and a substantially rigid construction is thereby provided. The outer end of each spiral member terminates in a hook 20.

At spaced intervals, the side chain members 10 and 11 have connecting links 21 attached thereto and as shown, the outer end of each link 21 is spiralled as at 22 for engagement with one of the links 12. The portion 22 is spiralled whereby the sides 23 and 24 of the member 21 will be properly spaced apart and will be arranged in substantially the same plane. The sides 23 and 24 are connected at their inner ends by an integral sloping bar 25, which extends outwardly from the tire and is curved to provide a substantially V-shaped socket 26 adjacent the side 23. It will be noted that the pull of each transverse member is transmitted to the link 21 by contact of the shoulder 19 and the portion of the spiral against which it lies. Such portion of the spiral corresponds in shape to the shoulder 19 to form a second shoulder, and thus two points of contact are provided between the spiral member and the bar 25. This construction provides an efficient connection between the spiral and the bar 25 and materially reduces wear between the parts.

The operation of the device is as follows:

The device is assembled by winding the spiral members upon the sides 24 of the links 21 until the bar 25 engages the stop shoulder 19, as shown in Figure 3. When this position has been reached the eye 17 will be substantially in alignment with the side 24 so that the pull of the transverse member will be in a direct line with the side 24. The length of the spiral member should be such that when fully wound up the tip of the hook 20 will lie directly between the sides 23 and 24, as shown in Figures 1, 2 and 3.

The pitch and diameter of the spirals should be such as to allow adequate clearance between the spirals and the side member 24 of the connecting link and to permit free turning movement of the spiral. It is to be noted that the end of the hook 20 lies outwardly slightly beyond the spirals as viewed in Figures 1, 2, 3 and 5, and is nearly straight. Moreover, the end of the hook diverges toward its extremity at a slight angle laterally with respect to the axis of the spiral. This feature is of importance in securing perfect operation, as will become apparent.

When a section of tread links breaks while the device is in use on a tire, centrifugal force causes the spiral members to unwind from the sides 24 of the opposite connecting links until the hooks reach the bars 25. When each hook reaches this point, its end 20 will be disposed inwardly of the bar 25 and the slope and curvature of the bar will cause the hook to slide downwardly along the slope of the bar into its proper position in the V-shaped slot 26, as shown in Figure 4. It will be obvious that after the bar is engaged by the hook, centrifugal force will have no further effect on the spiralled member and the broken transverse member will be carried in the position shown in Figure 4 until the broken ends of the tread links strike the ground.

As the tread links strike the ground, a force is exerted through them to the spiral member which causes the latter to move inwardly radially with respect to the wheel. This action lifts the hook from the notch 26 to release the hook from the bar 25, and as this action takes place, the portion 27 of the spiral will engage the bar 25 to throw the hook outwardly away from the bar. Thus as the spiral is unhooked it will be moved inwardly to clear the bar 25 and drop to the ground without danger of injury to persons or other vehicles.

It is believed to be obvious that I have provided a device from which broken transverse members will become detached at a predetermined point, in this instance at the ground. In practice it has been found that there will be no appreciable uncoiling of the spiralled members while the device is in use on a tire and during the normal course of handling when the device is being applied to or removed from a wheel. When the chains are in piles in bags, or the like, the spirals may unwind slightly due to kinks in the transverse members, but when the kinks are straightened out, the spirals will return to proper position. Therefore, a motorist need not ordinarily pay any attention to the spirals except when replacing lost transverse members.

With the bar 25 arranged as described the force of the blow when the broken tread links strike the ground is exerted, not in shifting the hook along the bar, but in lifting the hook from the bar until it becomes disengaged. The bar 25 is formed so that the hook will always swing around to the V-shaped socket 26, under which conditions it is practically impossible to knock the hook off by a blow from the right or the left. Moreover, with the hook so positioned, the spiral cannot tend to rewind on the link 21, while the fact that the bar is offset outwardly of the body of the link 21 and the tire, prevents these members from interfering with the movement of the spiral member as it is being unhooked. In this connection, it will be noted that the slight angularity of the end of the hook 20 facilitates the releasing of the hook as the latter is moved outwardly by the portion 27 of the spiral, and also eliminates any possibility of the extremity of the hook frictionally engaging against the side member 24 as the spiral is being unwound.

The curvature of the bar aids materially in throwing off the hook as such a bar fits the hook better and the latter can slip off of a curved bar much easier and with much greater clearance than would be true if a straight bar were used. With the V-shaped socket it is practically impossible for the hook to race back and forth along the bar and the slope of the latter should be no more than to insure movement of the hook down the bar into the socket.

It is preferred that the hook hang from the end of the bar to meet the special conditions presented by swinging chains. If the spiral swings after it is unwound, the hook remains in the socket 26, and regardless of such swinging, it has been found in actual practice that the hook will be readily disengaged at the proper time.

The eye 17 should be in line with the axis of the spiral to permit ready discharge of the broken tread links. In this connection it will be noted that the hook frequently disengages before the spiral itself touches the ground because the tread links, touching the ground first, back up against the spiral member and transmit a force through the spiral to lift the hook off.

With the bar 25 projecting outwardly the hook is held out from contact with the tire. This bar should be long enough to permit clearance between the top of the hook and the side 24 if the hook becomes disengaged while the transverse member is swinging a maximum distance to the left, as viewed in Figure 4. If desired, the side 23 may be deformed to prevent the spiral being wound upon the wrong side of the member 21.

The coiled arrangement at 22 provides the strength of a link construction for the members 21 and it is preferred that the ends of the members be suitably joined together at about the center of the side 23. However eyelets could be used on the members 21 if desired. The degree of play between the connecting links and the side chains depends upon the desirability of having the link and spiral stand out rigidly from the side chain or whether their direction should be allowed to conform to the degree of drag of the transverse members under normal operating conditions.

It has been found that accumulations of ice, snow, mud, etc., do not seriously affect the operation of the device. Even though a broken section should fail to become disengaged the first time it strikes the ground, due to tangling, etc., the section will straighten out during the next revolution of the wheel and will be in proper position to become disengaged the second time it strikes the ground.

In assembling the device it is preferred that the spirals of oppositely disposed spiral members be extended in the same direction to prevent accidental unspiralling of the members. Also, it will be apparent that the arrangement shown herein could readily be reversed whereby the spiral members 16 would be carried by the side members and the links 21 would be arranged on the ends of the transverse members, without affecting the operation of the device.

It is to be understood that the form of my invention herewith shown and described is to be taken as a preferred example of the same, and that various changes in the shape, size and arrangement of parts may be resorted to without departing from the spirit of the invention or the scope of the subjoined claims.

I claim:

1. In an anti-skid device for a vehicle wheel including side and transverse members, a link carried by one of said side members, a spiral member carried by one of said transverse members and adapted to be spirally mounted upon said link, said spiral member being adapted to be spirally unwound from said link upon breakage of said last named transverse member, and means for preventing total disengagement of said spiral member from said link until said broken transverse member has reached a predetermined point in its revolution with the wheel.

2. A device constructed in accordance with claim 1 wherein said means comprises a hook arranged on one end of said spiral member, said link being provided with a portion to engage said hook until said broken transverse member strikes the ground.

3. An anti-skid device for a vehicle wheel comprising a pair of spaced side members, a transverse member adapted to be connected between said side members, means for releasably connecting said transverse member to at least one of said side members whereby upon breakage of said transverse member the portion of the latter between the breaking point and said last mentioned side member will become partially disengaged from the latter, and means for preventing total disengagement of said portion of said transverse member until the latter has reached a predetermined point in its revolution with the wheel.

4. An anti-skid device for a vehicle wheel comprising a pair of spaced side members, a transverse member adapted to be connected between said side members, a link carried by one of said side members, means for releasably connecting one end of said transverse member to said link whereby upon breakage of said transverse member the portion of the latter between the breaking point and said link will become partially disengaged from said link, and means for preventing total disengagement of said portion of said transverse member until the latter has reached a predetermined point in its revolution with the wheel.

5. An anti-skid device for a vehicle wheel comprising a pair of spaced side members, a transverse member adapted to be connected between said side members, a link carried by one of said side members, a spiral member carried by one end of said transverse member and adapted to be spirally wound upon said link whereby said spiral member will become spirally unwound from said link upon breakage of said transverse member, and means arranged on one end of said spiral member for preventing total disengagement thereof from said link until said broken transverse member has reached a predetermined point in its revolution with the wheel.

6. In an anti-skid device for a vehicle wheel, means for detachably securing a transverse member to one of the side members of the device comprising a link carried by one of said side members, a spiral member carried by one end of said transverse member and adapted to spirally engage said link and to become spirally unwound therefrom upon breakage of said transverse member, a hook arranged on the free end of said spiral member, and a bar arranged on the free end of said link to engage said hook to prevent total disengagement of said spiral member until the broken portion of said transverse member strikes the ground.

7. A device constructed in accordance with claim 6 wherein said bar is arranged at an angle greater than a right angle with respect to the side of said link on which said spiral member is mounted.

8. A device constructed in accordance with claim 6 wherein said bar is provided with a substantially V-shaped socket to receive said hook.

9. A device constructed in accordance with claim 6 wherein said bar is offset from said link outwardly from the wheel.

10. In a device of the character described, a side member and a transverse member forming sections of an anti-skid device, a link carried by one section, a spiral member carried by the other section and adapted to be spirally mounted upon said link, said spiral member being adapted to be spirally unwound from said link upon breakage of said transverse member, and means for preventing total disengagement of said spiral member from said link until said broken transverse member has reached a predetermined point in its revolution with the wheel.

11. In a device of the character described, a side member and a transverse member forming sections of an anti-skid device, a link carried by one section, a spiral member carried by the other section and adapted to spirally engage said link, said spiral member being adapted to become spirally unwound from said link upon breakage of said transverse member, a hook arranged on the free end of said spiral member, and a bar arranged on the free end of said link to engage said hook and prevent total disengagement of said spiral member until the broken portion of said transverse member strikes the ground.

12. A device constructed in accordance with claim 11 wherein said bar is connected to the side of said link on which said spiral member is mounted and extends therefrom at an angle greater than a right angle.

13. A device constructed in accordance with claim 11 wherein said bar is provided with a substantially V-shaped socket to receive said hook.

14. A device constructed in accordance with claim 6 wherein said bar is offset from said link outwardly from the vehicle wheel.

In testimony whereof I affix my signature.

HORACE B. DRURY.